Patented Oct. 22, 1929

1,732,379

UNITED STATES PATENT OFFICE

GEORGE E. RICE, OF BROOKLYN, NEW YORK, ASSIGNOR TO CONSERVATION CORPORATION OF AMERICA, A CORPORATION OF DELAWARE

PROCESS FOR TREATING WOOD AND FIBERS

No Drawing.    Application filed March 3, 1926.    Serial No. 92,083.

The present invention relates to processes for treating wood and vegetable or other fibers, and aims to provide a novel and improved process for treating the wood or fiber for the purpose of impregnating, cleansing, seasoning and stabilizing the wood or fiber in an efficient and expeditious manner.

The invention comprehends the use of a process employing a solution in which the wood or fiber is immersed or with which the material is saturated, which solution contains a substance or ingredient that will, by osmotic action, penetrate the colloidal membranes or cell walls of the wood or fiber, in combination with a catalytic substance or ingredient that increases the osmosis in order to facilitate the action, not only to increase the efficiency of the process, but to also lessen the time required for treatment of the wood or fiber.

The process is especially advantageous for the treatment of wood, although it may be used, with suitable modifications, for the treatment of silk or various vegetable fibers used commercially, such as straw for the manufacture of straw hats, jute, hemp, bagasse, magasse and other fibers used for the manufacture of cords, ropes, and the like, tobacco, etc.

In my copending applications Serial Nos. 726,834, 735,218 and 21,695, filed July 18, 1924, Aug. 30, 1924, and April 8, 1925 respectively I have disclosed processes using sugar or saccharine solutions for treating, impregnating, seasoning and stabilizing wood, and the solutions disclosed in said applications utilize osmotic action for the penetration of the membranes or cell walls of the wood, enabling the processes to be carried out in open tanks under atmospheric pressure.

I have discovered that the osmosis may be increased by the use of a catalyst, so that by combining in the solution an osmosis producing substance or ingredient with a suitable catalytic agent, the osmotic action may be increased, so as to lessen the time required for treatment, as well as producing better results. The sugars have been found to be especially suitable for osmotic action, although other carbohydrates or organic compounds may be used, and it is also possible to use various salts having osmotic pressures when in solution, or other inorganic compounds.

Boron is a convenient and effective catalyst for use with the sugar solution, preferably in the form of boric acid $B(OH)_3$. Although sugar and boric acid are described herein as examples of the osmosis-producing and catalytic substances or ingredients of the solution, it will be apparent that other suitable equivalents may be used, within the spirit of the invention as set forth in the appended claims.

As an example of one use of the process, the process disclosed in application Serial No. 726,834 is taken as a basis.

The solution, according to the disclosure in application Serial No. 726,834, comprises 1200 pounds of water and 360 pounds of semi-invert sugar (either cane, beet or corn sugar) which contains not less than 40% of sucrose and not less than 20% of dextrose, or corn syrup which contains not less than 35% of natural dextrose and dextrin, the balance of the sugar being natural materials. To such solution there is added not less than 20% of dextrose manufactured from corn, either as glucose or in granulated form (no prepared dextrine by hydrolyzing, or roasted starch, being used.

These proportions may vary according to different grades of wood to be treated, but the amount of syrup or saccharine material is substantially 25% of the water, by weight.

The specific gravity of such solution at a temperature of about 60 degrees F. is about 1090, which will permit of the solution being thinned by adding water, to the desired reduced specific gravity, based on the density or absorption properties of the wood to be treated. The average specific gravity of the solution, during the treatment, should be between 1060 and 1100, and only water is added to reduce the specific gravity.

The catalyst (boric acid in this instance) is added to such sugar or saccharine solution and a minimum of boric acid, amounting to 1% by weight of the water used in the solution, is added to the solution, and greater amounts of boric acid may be employed to increase the osmotic activity. Before adding the boric acid the sugar solution is heated to a temperature of about 208 degrees F., and after the boric acid is added the solution is allowed to stand overnight, which results in a homogeneous mixture.

The wood may be of any shape or form, either logs, squared timber, or wood products cut to size and shape as may be desired, and if logs are treated, the bark and small branches are first removed. The wood is immersed in the liquor or solution, and the solution is then heated gradually, in order to heat the wood to the center without damaging the cell walls. Any suitable tank may be used, preferably an open top rectangular tank, which should, for general use, not exceed 7 feet in width to insure proper and rapid regulation of the solution, but the tank may be of any desired length and depth. The solution may be heated directly or indirectly, a preferred manner of heating being by the use of steam coils or radiators submerged in the solution, so that the temperature may be raised gradually to and maintained at the boiling point of water.

The wood may be immersed by several convenient ways, such as by loading the wood on skids or cars run into the tank, by moving the wood into the tank by an overhead conveyor, or by piling the lumber up in the tank. It is desirable to reduce the handling of the wood to a minimum by loading the wood on skids or trucks, or in crates, baskets or other carriers, depending on the size and shape of the wood or wood products. It will, in many instances, also be more economical to shape or prepare the wood previous to treatment, thus saving operating costs, inasmuch as it is unnecessary to treat the wood which is cut away as waste.

When the wood is immersed in the solution, the solution is heated gradually to raise the temperature to the boiling point of water, thereby avoiding injury to the wood. The boiling point at sea level will be 212 degrees F., and will decrease at higher altitudes. The boiling of the wood is continued until all extraneous matters are removed therefrom, which is determined when no further scum rises to the surface of the liquor. During the boiling of the wood, the scum and froth rise to the surface of the solution, and are skimmed off. The skimmings are preserved, and valuable by-products, such as acids, oils, etc., are recovered, and the residuum dehydrated for use as fertilizer or for other purposes.

When the wood has been boiled a sufficient length of time, and no further scrum rises to the surface of the liquor, then the wood is removed either immediately or allowed to remain until impregnated to a required density, according to the use or requirements. With the process disclosed in application Serial No. 726,834, it requires anywhere from a fraction of an hour to several hours for the treatment, whereas with the use of the catalyst the length of time is reduced. The wood is allowed to remain in the solution for a period of time based on the rapidity of the absorption properties of the wood being treated, and after the wood is removed from the solution it is then dried in any desired or preferred manner, either naturally or by a steam heated or other suitable drier. The treated wood has the advantage of drying rapidly, which is facilitated by the cleansing of the wood.

When the wood has been removed from the solution or vice versa, the solution is tested for its specific gravity. If the specific gravity is correct and the solution has cooled down to the specified temperature, it is ready for the next load of wood.

During the treatment or boiling of the immersed lumber in the prepared solution, the solution penetrates the wood longitudinally at first, by way of the resin canals or vessels, and such woods as oak, ash, beech, mahogany, etc., respond very rapidly, while in such woods as spruce, the pines, etc., in which there are few or no vessels or resin passages, penetration takes place through the walls of the tracheids, and in some cases a slower transverse penetration by way of the rays. In any case, the preservative solution reaches the center of the summer or sap wood, or immature growth, speedily and completely and where required the heart.

The process is a natural one, the action of a similar on a similar, and as the wood is impregnated by capillary and osmotic action, the excess matters removed from the wood are replaced by a material of a composition akin to that of the wood itself or its own.

The present process follows somewhat a natural process, the sugar or other osmosis producing substance used in the solution having the ability to penetrate the colloidal membranes or cell walls which have enormous strength, in live wood, even surpassing that of iron. The sugar or equivalent material causes a shrinkage of the highly sprung cell walls, and by using the catalyst the osmotic action is increased considerably. This increase of activity is indicated by the greater rapidity of movement of the scum at the surface of the solution, the scum moving from one end of the tank to the other.

With the process disclosed in application Serial No. 726,834 a flow of scum at the rate of about 3 feet per minute was noted, and under the same circumstances with the addition of boric acid an average flow of the scum of 8 feet per minute was noted, indicating an activity almost three times as great. Furthermore, by the use of the boric acid it has been found that there is an increase in the hardness and density of the under-nourished or weak woods, and the difference is very pronounced.

After the process was completed and the wood dried, the solution was found in the very center of the red heart beech, birch and maple, fresh felled trees being used for all tests. The treated wood was also more dense, less absorbent and harder. By the use of the present process such woods as beech, birch, maple and poplar, all heart or heart and sap stock, from wood that had been in standing trees the day before, were completely treated and the wood turned on lathes into tool handles and such handles sand-papered ready for use. The wood, by the present process, is thoroughly sterilized, cleansed and freed from all excess extraneous matters, and is completely stabilized and dried without injury to the wood.

During the process, as the boiling continues, the deleterious or undesirable elements are thus extracted from the wood by the boiling solution, and as the hot solution reaches the interior of the wood, any remaining albuminoids will be coagulated, worms or insect pupæ will be killed and complete sterilization will be effected, and the saps and natural moisture vaporized.

When using the process for the treatment of vegetable fibers, such as straw, hemp, jute, bagasse and the like, the solution is modified, and some of the ingredients used for different grades of woods need not be employed, and a plain sugar or saccharine solution with a suitable catalyst may suffice in most instances.

Although the process is conveniently carried out in an open tank under atmospheric pressure, it is also possible to use the process in connection with either a pressure or a vacuum tank, such pressure and vacuum tanks being well known in the art.

Having thus described the invention, what is claimed as new is:—

1. The process of treating wood or fiber consisting in impregnating same with a solution containing a substance having osmotic action in the wood or fiber and a boron compound for increasing the osmotic action of said substance.

2. The process of treating wood or fiber consisting in impregnating same with a solution containing a substance having osmotic action in the wood or fiber and boric acid for increasing the osmotic action of said substance.

3. The process of treating wood or fiber consisting in impregnating same with a sugar solution containing a boron compound to increase the osmotic action of the sugar.

4. The process of treating wood or fiber consisting in impregnating same with a sugar solution containing boric acid.

In testimony whereof I hereunto affix my signature.

GEORGE E. RICE.